United States Patent [19]

Holdway

[11] Patent Number: 4,779,786
[45] Date of Patent: Oct. 25, 1988

[54] DESOLDERING DEVICE

[75] Inventor: John B. Holdway, College Park, Md.

[73] Assignee: Pace Incorporated, Laurel, Md.

[21] Appl. No.: 857,097

[22] Filed: Apr. 29, 1986

[51] Int. Cl.$^4$ .............................................. B23K 3/00
[52] U.S. Cl. ...................................... 228/20; 228/55; 219/230
[58] Field of Search ................... 228/20, 55, 51, 20 R, 228/20 HT; 15/415 R; 219/230

[56] References Cited

U.S. PATENT DOCUMENTS

| 1,053,035 | 2/1913 | Houghland | 15/415 X |
|---|---|---|---|
| 1,519,246 | 12/1924 | Forshee et al. | |
| 1,928,522 | 9/1933 | Amundsen | |
| 2,093,527 | 9/1937 | Petti | |
| 2,436,552 | 2/1948 | Cooper | |
| 2,745,939 | 5/1956 | Lenk | 219/230 |
| 2,955,187 | 10/1960 | Campo | 219/230 X |
| 2,955,188 | 10/1960 | Campo | |
| 2,960,591 | 11/1960 | Brillinger | |
| 3,169,499 | 2/1968 | Armanno | 228/20 |
| 3,211,354 | 10/1965 | Dugard et al. | |
| 3,392,897 | 7/1968 | Siegel | |
| 3,422,247 | 1/1960 | Royston et al. | |
| 3,480,759 | 11/1969 | Sachs et al. | 228/55 X |
| 3,842,240 | 10/1974 | Wakita et al. | |
| 3,965,608 | 6/1976 | Schuman | |
| 3,980,218 | 9/1976 | Fortune | |
| 4,178,496 | 12/1979 | Fortune | 228/55 X |
| 4,206,864 | 6/1980 | Rauchwerger | |
| 4,230,250 | 10/1980 | Scheu, Jr. | 219/230 X |
| 4,274,176 | 6/1981 | Undin et al. | |
| 4,469,934 | 9/1984 | Isshiki et al. | 219/230 X |
| 4,568,819 | 2/1986 | Stacconi | 228/51 X |
| 4,574,994 | 3/1986 | Rauchwerger | 228/20 |

FOREIGN PATENT DOCUMENTS 2644946 10/1976 Fed. Rep. of Germany.

Primary Examiner—Nicholas P. Godici
Assistant Examiner—Carmine Cuda
Attorney, Agent, or Firm—Gerald J. Ferguson, Jr.

[57] ABSTRACT

A desoldering device is disclosed having a solder transferring tube in communication with a solder collection chamber and a pivotal handle attached to the solder collection chamber so that the handle may assume within a plane different angular positions with respect to the solder transfer tube without affecting proper orientation of the tubular front portion with respect to a workpiece. Moreover, a switch for controlling the vacuum is disposed on the handle and the handle is rotatable about its own axis so that the vacuum switch may have various orientations with respect to the plane in which the handle may assume different angular positions.

16 Claims, 3 Drawing Sheets

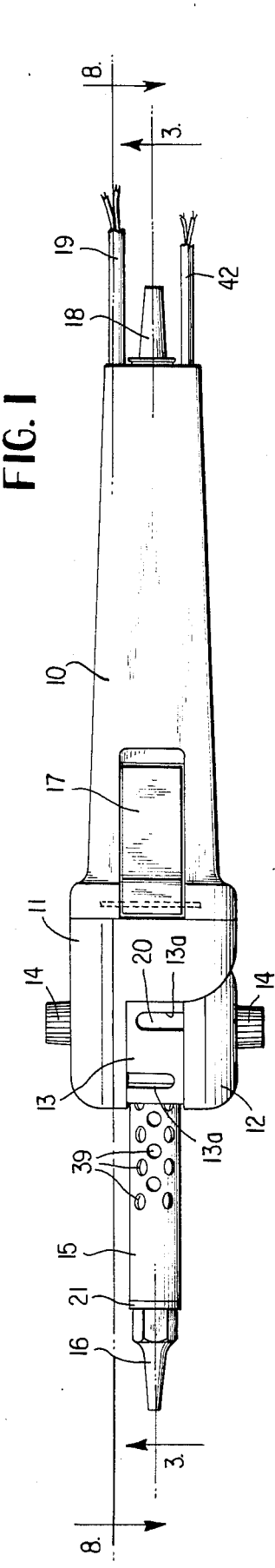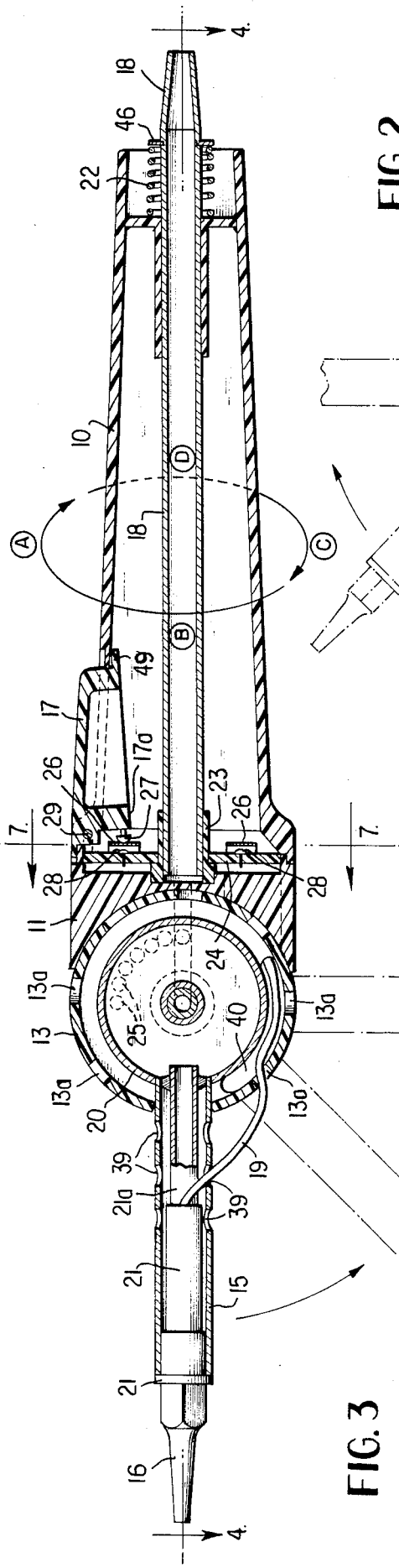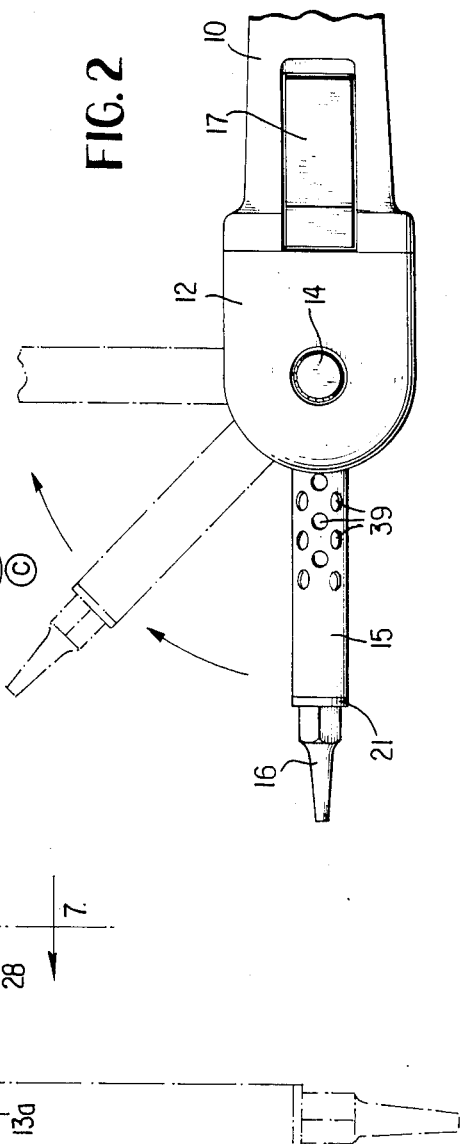

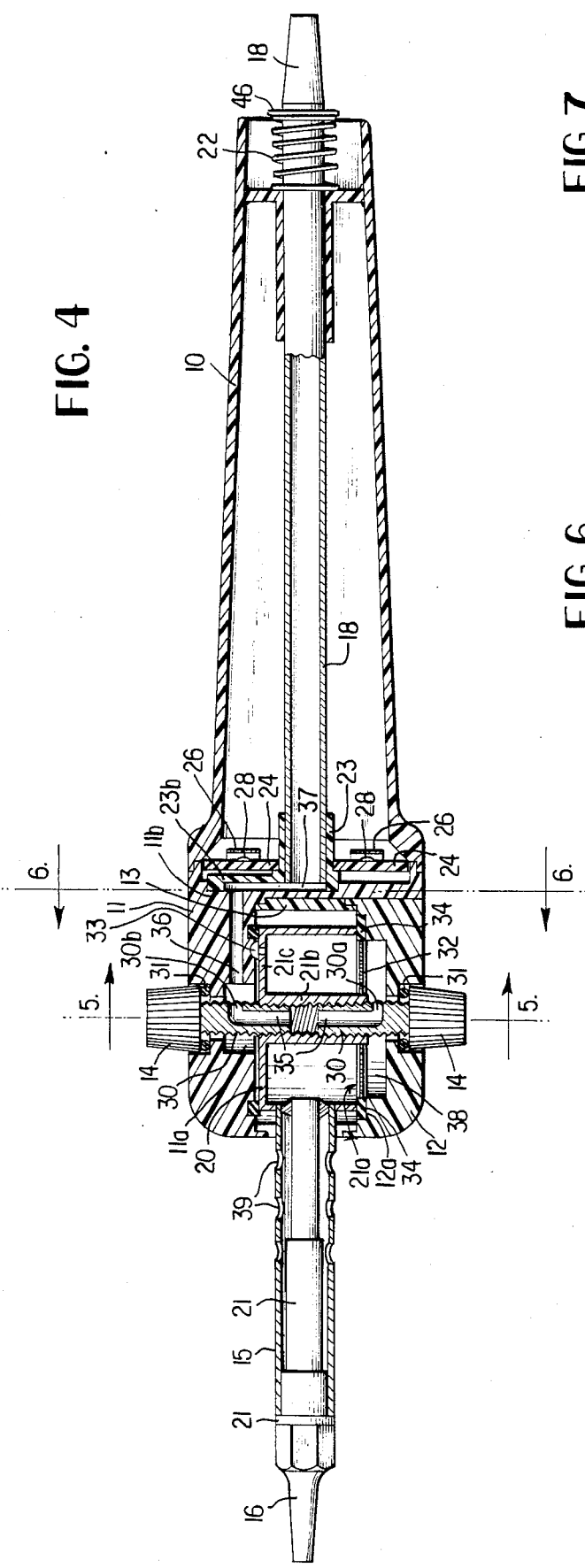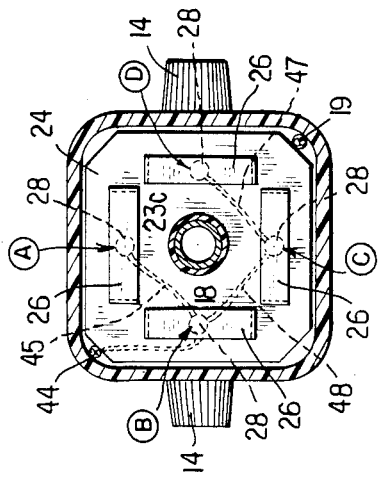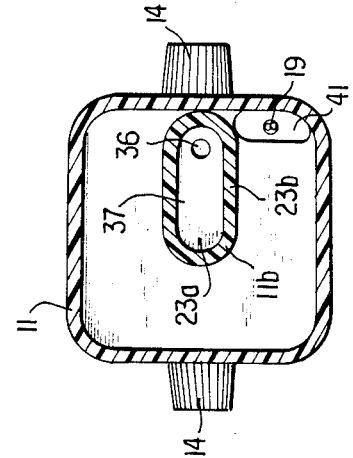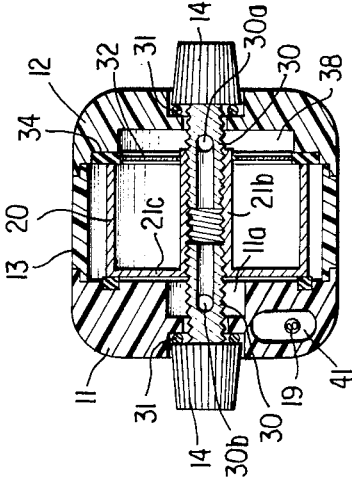

DESOLDERING DEVICE

BACKGROUND OF THE INVENTION AND PRIOR ART

This invention is directed to a solder removal device.

There are known solder removal devices of varying forms such as the straight line pencil type described in U.S. Pat. No. 4,269,343 to Siegel, et al., the pistol grip type described in U.S. Pat. No. 3,842,240 to Wakita, et al. and numerous others in which the angle of the desoldering tip with respect to the handle is fixed in the range between 90° and 180°. In addition, many of these devices have finger-actuated switches on the hand pieces which generally operate the vacuum. Due to the fixed location of these switches, but more importantly the fixed angle between the desoldering tip and the handle, the operator's ability to alter hand positioning to suit individual preferences while simultaneously maintaining adequate control and proper positioning of the desoldering tip to the work is greatly limited.

Attempts have been made in the past to obviate similar hand positioning problems with regard to soldering irons with such adjustable devices as those disclosed in U.S. Pat. Nos. 1,519,246, and 1,928,522. However, the teachings of these patents cannot be successfully applied to desoldering devices due to the greater complexity thereof and the fundamental differences between desoldering and soldering.

Of primary importance in desoldering is the requirement that the desoldering tip must almost always assume a nearly exactly perpendicular position with respect to the work (typically a circuit board) in order to achieve an adequate seal so that molten solder can be aspirated completely, thereby freeing the solder joint. Tip positioning in soldering, although important, is not nearly as critical and the operator has much more flexibility in varying the tip position to suit his or her individual hand positioning requirements during soldering.

In addition, desoldering requires the frequent activation of a vacuum source which is often controlled by a switch on the desoldering handpiece itself. This therefore presents an additional hand positioning preference factor not present in soldering which also must be accomodated.

Finally, successful desoldering generally requires much greater control over the movement of the tip than is required in soldering because a component lead must be oscillated immediately before and during the actuation of the vacuum in order to allow the joint to cool down below the solder melt temperature and prevent the formation of a re-sweat joint.

The various desoldering devices mentioned above, with their varying configurations and angles, have not adequately addressed these problems and considerations inherent in desoldering.

Another problem common to these desoldering devices, especially those in which the molten aspirated solder must pass through angled passages and traverse a relatively great distance in order to reach the solder receptacle, is that of clogging. This results from a build-up of solder oxidation products and bits of solidified solder which do not remain in the liquid state long enough to reach the solder receptacle. Frequent clogging results in an inordinate amount of down time when the desoldering device must be cleaned. The cleaning of the device itself is hindered by angled passages of the solder path.

Still a further problem common to many of these desoldering devices is the overheating of the handle during continuous operation. This overheating not only presents a great discomfort to the operator but also could result in loss of efficiency and accuracy of work. Although this problem of overheating in part results from conduction and convection of hot air coming off of the heater element near the tip of the desoldering device, such overheating is also caused by the fact that the receptacle for the aspirated molten solder is contained within the hand piece itself.

OBJECT OF THE INVENTION

It is an object of the present invention to provide a desoldering device whose hand piece can be adjusted to suit the individual needs of the operator while simultaneously allowing for sufficient control and positioning during the desoldering process.

It is a further object of the present invention to provide a new and improved desoldering device in which the path of the aspirated solder is relatively short and remains in a straight line regardless of the angling or positioning of the handle of the desoldering device with respect to the desoldering tip.

It is yet another object of the present invention to provide a new and improved desoldering device which, due to its relatively short and straight line solder path, will not clog and is easy to clean and maintain.

It is yet another object of the present invention to provide a new and improved desoldering device in which the solder collection chamber is positioned before the handle and thus minimizes the transfer of heat to the handle.

Other features and advantages of the present invention will be apparent by reference to the accompanying drawings.

BRIEF DESCRIPTION OF THE DRAWINGS

FIG. 1 is a side view of a desoldering device in accordance with the present invention;

FIG. 2 is a plan view of the fore section of a desoldering device in accordance with the present invention the handle section of which is rotated 90°; i.e., to position B in FIG. 3;

FIG. 3 is a sectional view taken along line 3—3 of FIG. 1;

FIG. 4 is a sectional plan view taken along line 4—4 of FIG. 3;

FIG. 5 is a sectional view taken along line 5—5 of FIG. 4;

FIG. 6 is a sectional view taken along line 6—6 of FIG. 4;

FIG. 7 is a sectional view taken along line 7—7 of FIG. 3;

DETAILED DESCRIPTION OF A PREFERRED EMBODIMENT

Figure 8:
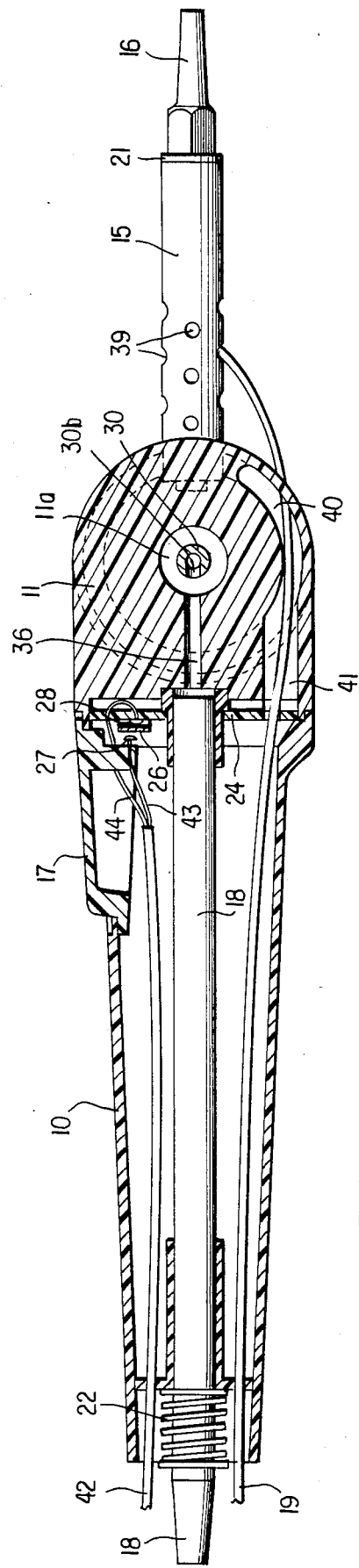
FIG. 8 is a sectional view taken along line 8—8 of FIG. 1.

Referring to FIGS. 1 through 9 which illustrate one embodiment of the present invention, a desoldering device in accordance with the present invention comprises the hollow handle 10, having thereon a finger actuated switch 17, and a frontal housing 11 within which the cover 13, the disk shaped member 12, the solder collection chamber 20, the heater housing 15, the heater 21, and the desoldering tip 16 articulate about the axis formed by the lock nuts 14 and the threaded members 30 which are shown in FIG. 4.

The hollow handle 10, finger actuated switch 17, frontal housing 11, cover 13, and disk shaped member 12, may be constructed of a high temperature injection molded plastic or other suitable material. The solder collection chamber 20, cover 13, heater housing 15, heater 21 and desoldering tip 16 pivot together as a unit and will for convenience of discussion hereinafter be referred to collectively as the front pivoting portion.

In FIGS. 2 and 3, the front pivoting portion and the length of the hollow handle 10 form a straight line or a 180° angle about the axis formed by the lock nuts 14 and the threaded members 30. Also shown in FIGS. 2 and 3, in phantom, are the various angular positions that the front pivoting portion may assume with respect to hollow handle 10. Although the phantom portions of FIGS. 2 and 3 show only a 135° angle and a 90° angle formed by the front pivoting portion and the hollow handle, the device may assume a multitude of angles between 180° and 90° depending upon the spacing of the circular depressions 25 in the frontal housing 11 which form a detent in conjunction with the knob 33, positioned on the surface of the solder collection chamber, which engages into one of the circular depressions at a desired position (FIGS. 3 and 4). In addition, a sufficient number of circular depressions may be made into the frontal housing 11 so that the front pivoting portion may pivot a full 180° thereby forming all desired angles with the hollow handle 10 from 90° through 180° and then through 270° although the 90° to 180° range is preferred.

The desoldering tip 16 is tubular in form, well known to the art and readily available from commercial sources. The desoldering tip 16 may be threaded into the heater 21 or attached thereto in some other suitable manner. The heater 21 is also tubular in form and may be composed of resistance coils wrapped around and insulated from a solder transfer tube 21a. Such tubular-shaped heaters are also well known to the art and commercially available. The heater 21 is powered by a wire 19 which may lead out of the heater housing 15 through an orifice 39 (FIG. 3), pass through the openings 40 and 41 in the frontal housing 11 (FIGS. 3, 6, and 8), and extend back through the hollow handle 10 to an external power source (not shown).

The heater housing 15 extends back through an opening or slot 13a in the cover 13 and may be attached to the solder collection chamber 20 by brazing, welding, or some other suitable means (FIG. 3). Within the heater housing 15, the solder transfer tube 21a extends back into the solder collection chamber 20. The solder collection chamber 20 may be made of a nickel plated steel or some other suitable material and may be in the form of a flat, closed hollow cylinder open at one end, as indicated at 21a in FIG. 4, or may have some other suitable shape. The solder collection chamber 20 is, in turn, mounted to the frontal portion 11 along with the cover 13 and the disk shaped member 12 by means of the lock nuts 14 having hollow externally threaded members 30 which thread into an internally threaded female projection 21b of the solder collection chamber 20 located at the center thereof, projection 21b being connected to closed end 21c of chamber 20 and extending to the open end 21a of the chamber (FIGS. 1 and 4).

Proper sealing and locking of the lock nuts 14 is assured by the O-ring seals 31, as shown in FIG. 4, and may be made of a heat resistant rubber or some other suitable material.

Located between the open side 21a of the solder collection chamber 20 and the disk shaped member 12 is an air filter 32 attached to or supported by a gasket 34, the gasket being supported by a step 12a in member 12. The filter may be of cotton or some other suitable material which will not ignite when it contacts molten or hot solder. Adjacent the filter 32 is a chamber 38 which is formed by a concavity in the disc shaped member 12. Communicating with the chamber 38 is a passage 35 which is composed of the hollow portions of the threaded members 30 and the hollow, internally threaded female projection 21b of the solder collection chamber 20, hollow portion of the lower threaded member 30 in FIG. 4 opening into chamber 38 via an opening 30a in the latter member 30. The passage 35 then leads into the passage 36 via an opening 30b in the upper threaded member and a cylindrical recess 11a in the frontal portion 11, the passage 36 communicating with recess 11a and extending through the frontal portion 11. The passage 36 then communicates with the passage 37 which is formed by an oval-shaped concave recess 11b (FIGS. 4 and 6) disposed on the rear surface of frontal portion 11 and a member 23 disposed within recess 11b and having an oval shaped concavity 23a disposed therein to thus form passage 37. As shown in FIG. 4, member 23 is fixedly mounted on a tube 18 and thus member 23 includes portion 23c which is mounted on tube 18 and portion 23b which includes concavity 23a. The passage 37, communicates with the hollow portion of tube 18 which traverses the length of the hollow handle 10 and which may then lead out to an external source of vacuum (not shown).

Inasmuch as the solder collection chamber 20 is located within the front pivoting portion of the device and not within the hollow handle 10, as it often is in other solder removal devices, a miniature vacuum pump (not shown) or a venturi system (not shown) which operates on shop air could be located within the hollow handle and thus obviate the need for an external source of vacuum.

Alternatively, if an external source of vacuum is desired, vacuum rise time at the desoldering tip 16 could be greatly reduced by including a vacuum storage tank (not shown) within the hollow handle 10 such as that shown at 2 in U.S. Pat. No. 3,842,240, which is hereby incorporated by reference.

Referring now to FIGS. 1 through 9, the finger actuated switch 17 located on the hollow handle 10 may be used to switch on an external vacuum source or shop air which, in turn, would supply vacuum to the desoldering device through a venturi in the hollow handle 10. The finger actuated switch 17 is mounted within the hollow handle 10 by means of a pin 29 (FIG. 3) about which the switch 17 pivots. The switch 17 is also spring biased in the up-open position by a suitable spring means (not shown) and is prevented from leaving the handle by the stop 49. The lead 42, which may connect to an external air or vacuum source (not shown) leads into the back of the hollow handle 10 through the length thereof and is divided into two separate wires 43 and 44. The wire 43 is soldered or otherwise suitably fastened to the contact point 27 which protrudes from the frontal portion 17a of the finger actuated switch 17 (FIGS. 3 and 8). The wire 44 is connected to one of the contact points 28

(FIGS. 3, 7, and 8), mounted on the plate 24, which are, in turn connected in parallel by the wires 45, 47 and 48. The plate 24 may be of a suitable circuit board material such as a phenolic resin or fiberglass and is mounted on portion 23c of member 23.

In operation, the finger actuated switch 17 is depressed causing the contact point 27 to depress the intermediate leaf member 26 (FIGS. 3, 7, and 8) and, in turn, make contact with contact point 28, thus initiating the source of vacuum to the desoldering device.

In FIGS. 3 and 7, reference letters A, B, C and D should be noted with particularity. These reference letters correspond to four different orientations the hollow handle 10 and the finger actuated switch 17 may assume in relation to the frontal housing 11 and the plate 24. In FIG. 3, the handle is shown in position A with respect to the frontal housing 11 and the plate 24. In other words, the contact point 27 of the switch 17 is in contact with the leaf member 26 and the contact point 28 at position A (see FIG. 7). The hollow handle 10 now may be pulled slightly in the direction away from frontal housing 11 against the bias of the spring 22 which is fixed to a predetermined point on the tube 18 by the clip 46, then rotated about the riser tube 18 by 90°, then pushed forward by the spring bias, and then engaged into position B with respect to the plate 24 as shown in FIG. 2. Now, the contact point 27 of the finger actuated switch 17 makes contact with the leaf member 26 and the contact point 28 located at position B of the plate 24 (FIG. 7). Because the four contact points 28 of plate 24 are connected in parallel, actuation of the switch 17 closes the same circuit at any position A through D.

Figure 9:
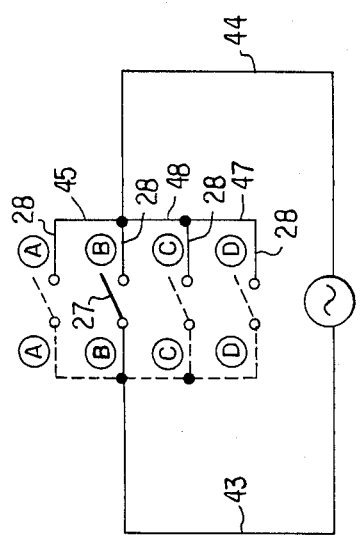
FIG. 9 is a circuit diagram providing greater detail of the electrical connections shown in FIGS. 7 and 8.

Referring now to FIG. 9, which is a circuit diagram of the electrical contacts made between the contact point 27 and the contact points 28 corresponding to positions A through D on the plate 24, the phantom lines in the diagram correspond to the three other positions the contact point 27 may assume when the hollow handle 10 is rotated about the riser tube 18 in 90° increments.

In operation, the ability of the hollow handle 10 and finger actuated switch 17 to assume any of the four positions A through D in conjunctio with the freedom of movement of the front pivoting portion of the desoldering device provides the operator with great flexibility in hand positioning and operation of the device. As such, the operator may adjust the desoldering device to assume the form of the pistol grip type desoldering devices, the pencil type straight line desoldering devices and any number of the desoldering devices with angles in between.

A major advantage of the present invention over existing devices in the art is that the operator cannot only manipulate the device to suit his or her individual comfort requirements, but also simultaneously maintain proper positioning of the desoldering tip with respect to the work and a proper level of control for the particular job at hand.

Of further significance in the field of desoldering devices is that the above-mentioned features of operator comfort, control, and proper positioning to the work all can be achieved while the path, through which the absorbed molten solder travels to the solder collection chamber, is a relatively short, substantially straight line and therefore eliminates many of the clogging and cleaning difficulties associated with many existing desoldering devices.

In operation, the heater 21, through conduction, heats the desoldering tip 16 to a desired solder melt temperature. As the tip is placed on a solder joint and the solder joint becomes completely melted, the vacuum is switched on by the finger actuated switch 17 and the molten solder is aspirated through the desolder tip 16, through the solder transfer tube of the heater 21 and into the solder collection chamber 20 where it solidifies. The air filter 32 prevents the solder from leaving the solder collection chamber yet permits the flow of air to continue into the chamber 38, through the passages 35, 36 and 37, and finally through the tube 18 to the external vacuum source. Solidified solder is easily removed from the solder collection chamber 38 by unscrewing the lower lock nut 14 including threaded member 30 in FIG. 4, removing the disc shaped member 12 and the air filter 32, and knocking the solder out.

It should be noted that typically the solder collection chamber 28 will be accessible as described above with respect to the cleaning thereof whenever it is desired to adjust the angle of the front pivoting portion with respect to the handle. This is simply done by rotating the chamber 28 and its cover 13 until the knob 33 engages the circular depression 25 which provides the desired angle. The disc shaped member 12 and air filter 32 are then replaced and again secured to cover 13 and chamber 28 by screwing the lower nut 14 including threaded member 30 in FIG. 4 into the projection 21b of chamber 28 such that the cover 13 is held in place between disc shaped member 12 and frontal housing 11 and the front pivoting portion is held at the desired angle. Slots 13a (FIG. 1) may be provided in cover 13 to facilitate cooling of chamber 38.

A further advantage of the present invention is that the hot molten solder travels no further than the solder collection chamber. This feature provides much greater comfort for the operator, especially during continuous operation because the handle stays cooler.

It will be obvious to those skilled in the art that many modifications may be made within the scope of the present invention without departing from the spirit thereof, and the invention includes all such modifications.

What is claimed is:

1. A desoldering device comprising:
    a tubular solder transfer member;
    a solder collection chamber in communication with said tubular solder transfer member;
    a handle;
    means for supplying heat to said tubular solder transfer member;
    means for applying vacuum to said solder collection chamber and tubular solder transfer member;
    means pivotally mounting said handle with respect to said tubular solder transfer member, whereby said handle may assume within a plane different angular positions with respect to the tubular solder transfer member without affecting proper orientation of the tubular solder transfer member with respect to a workpiece, wherein said means pivotally mounting said handle defines a pivot axis substantially perpendicular to the longitudinal axis of the tubular solder transfer member and said pivot axis passes through said solder collection chamber.

2. A device according to claim 1, including means hereby said solder collection chamber is located outside said handle whereby the handle is relatively cool during operation of said desoldering device.

3. A device according to claim 1, further comprising a control means on said handle for controlling said means for applying vacuum.

4. A device according to claim 3, wherein said handle may assume various positions about its own longitudinal axis such that said control means may have various orientations with respect to said plane in which the handle may assume different angular positions with respect to said tubular solder transfer member.

5. A device according to claim 1, in which said means for applying vacuum is substantially entirely within said handle.

6. A device according to claim 1, further comprising a vacuum storage tank within said handle.

7. A device according to claim 1, further comprising a venturi means within said handle adapted to apply vacuum to said solder collection chamber and said tubular solder transfer member upon the introduction of pressurized air into said venturi means.

8. A device according to claim 1 where said handle is at 90° with respect to said tubular solder transfer member such that the configuration of the device is of the pistol-grip type.

9. A device according to claim 1 where said handle is in line with said tubular solder transfer member such that the confifuration of the device is of the pencil type.

10. A device as in claim 1 where said solder collection chamber is cylindrical and the axis about which the handle pivots passes approximately through the longitudinal axis of the cylindrical solder collection chamber.

11. A device as in claim 10 including detenting means for detenting said cylindrical solder collection chamber in various ones of said angular positions.

12. A device as in claim 10 where said cylindrical solder collection chamber includes a tubular passageway extending therethrough and means for connecting one end of said passageway to a source of vacuum and the other end of said passageway to the interior of the solder collection chamber such that a vacuum path from said workpiece to said vacuum source extends through the tubular solder transfer member, the interior of the solder collection chamber, the tubular passageway, and then to the vacuum source.

13. A device as in claim 12 including an air porous filter disposed between the interior of the solder collection chamber and the tubular passageway.

14. A device as in claim 12 where one end of said cylindrical solder collection chamber is open and a filter is disposed within said open end such that the filter is disposed between the interior of the chamber and the tubular passageway.

15. A device according to claim 1, including means whereby said tubular solder transfer member and said solder collection chamber maintain a substantially straight-line path for molten solder passing from said workplace to said solder collection chamber regardless of the angular position of the handle with respect to said tubular solder transfer member.

16. A desoldering device comprising:
a tubular solder transfer member;
a solder collection chamber in communication with said tubular solder transfer member, said solder collection chamber being cylindrical and having a longitudinal axis;
a handle having an axis;
means for supplying heat to said tubular transfer member;
means for applying vacuum to said solder collection chamber and tubular solder transfer member; and
means pivotally mounting said handle with respect to said tubular solder transfer member, whereby said handle may assume within a plane different angular positions with respect to the tubular solder transfer member without affecting proper orientation of the tubular solder transfer member with respect to a workpiece, wherein the axis about which the handle pivots passes approximately through the longitudinal axis of the cylindrical solder collection chamber and is substantially perpendicular to the longitudinal axis of the tubular solder transfer member.

* * * * *